(12) United States Patent
Xie et al.

(10) Patent No.: US 10,430,636 B2
(45) Date of Patent: Oct. 1, 2019

(54) DISPLAY PANEL AND DISPLAY DEVICE

(71) Applicant: Shanghai Tianma Micro-Electronics Co., Ltd., Shanghai (CN)

(72) Inventors: Liang Xie, Shanghai (CN); Yang Zeng, Shanghai (CN); Lihua Wang, Shanghai (CN); Haochi Yu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 113 days.

(21) Appl. No.: 15/891,112

(22) Filed: Feb. 7, 2018

(65) Prior Publication Data

US 2018/0165498 A1    Jun. 14, 2018

(30) Foreign Application Priority Data

Jan. 3, 2018  (CN) .......................... 2018 1 0004021

(51) Int. Cl.
*G06K 9/00* (2006.01)
*G09G 3/3225* (2016.01)
*G09G 3/3233* (2016.01)

(52) U.S. Cl.
CPC ......... *G06K 9/0004* (2013.01); *G09G 3/3225* (2013.01); *G09G 3/3233* (2013.01); *G09G 2300/0426* (2013.01); *G09G 2300/0819* (2013.01); *G09G 2300/0842* (2013.01);
(Continued)

(58) Field of Classification Search
None
See application file for complete search history.

(56) References Cited

U.S. PATENT DOCUMENTS 8,917,387 B1 * 12/2014 Lee ...................... G06K 9/0004
356/71
10,331,939 B2 * 6/2019 He ...................... G06K 9/00087
10,339,359 B2 * 7/2019 Zhang .................. G02B 5/3025
(Continued)

FOREIGN PATENT DOCUMENTS

CN         107133613 A    9/2017

OTHER PUBLICATIONS

Kannada et al, OLED display incorporating organic photodiodes for fingerprint imaging, J Soc Inf Display. 2019;27:361-371. (Year: 2019).*

*Primary Examiner* — Andrae S Allison
(74) *Attorney, Agent, or Firm* — Anova Law Group, PLLC

(57) ABSTRACT

A display panel includes an array substrate including organic light-emitting structures, and at least one fingerprint identification unit. Each organic light-emitting structure has a first side facing the array substrate, and the fingerprint identification unit is disposed in a display region on the first side of the organic light-emitting structure. The display panel also includes a plurality of spacers and a plurality of anti-crosstalk pads. When being projected onto the array substrate, the orthogonal projection of each spacer is disposed between orthogonal projections of adjacent organic light-emitting structures. Each anti-crosstalk pad is disposed between a corresponding spacer and the fingerprint identification unit. An orthogonal projection of the anti-crosstalk pad onto the array substrate include a first region overlapping with the orthogonal projection of the spacer onto the array substrate. The anti-crosstalk pad blocks light scattered by the spacer from entering the at least one fingerprint identification unit.

19 Claims, 13 Drawing Sheets

(52) U.S. Cl.
CPC ............... *G09G 2300/0861* (2013.01); *G09G 2310/0262* (2013.01); *G09G 2354/00* (2013.01)

(56) References Cited

U.S. PATENT DOCUMENTS

| | | | |
|---|---|---|---|
| 2015/0331508 A1* | 11/2015 | Nho .................... | G06F 3/0421 345/173 |
| 2016/0266695 A1* | 9/2016 | Bae ..................... | G06F 1/1643 |
| 2017/0010496 A1* | 1/2017 | Shim ................... | G02F 1/13394 |
| 2017/0220838 A1* | 8/2017 | He ...................... | G06K 9/0004 |
| 2017/0255816 A1* | 9/2017 | Gao ................... | G06K 9/00053 |
| 2018/0005005 A1* | 1/2018 | He ....................... | G06F 3/0412 |
| 2018/0129798 A1* | 5/2018 | He ..................... | G06K 9/00013 |
| 2018/0165496 A1* | 6/2018 | Cheng ................ | H01L 27/3227 |
| 2018/0211085 A1* | 7/2018 | Liu ..................... | G02F 1/13306 |
| 2018/0233531 A1* | 8/2018 | Huang ................ | G06K 9/0004 |

\* cited by examiner

DISPLAY PANEL AND DISPLAY DEVICE

CROSS-REFERENCES TO RELATED APPLICATIONS

This application claims the priority of Chinese patent application No. 201810004021.9, filed on Jan. 3, 2018, the entirety of which is incorporated herein by reference.

FIELD OF THE DISCLOSURE

The present disclosure generally relates to the field of display technology and, more particularly, relates to a display panel and a display device.

BACKGROUND

A fingerprint is a mark made by the pattern of ridges on the pad of a human finger, which is innate and unique for everyone. With the development of technology, a variety of display devices with fingerprint identification functions, such as mobile phones, tablet computers, wearable smart devices, etc., have appeared on the market. To operate a display device with the fingerprint recognition function, the user may only touch fingerprint identification units of the display device by his/her finger for permission verification, thereby simplifying the permission verification process.

In an existing display device, a plurality of fingerprint identification units are directly disposed in the display region of the display panel. However, because components arranged in the display region of the display panel scatter the light emitted from the fingerprint-identification light source or the light reflected by the finger, the detection accuracy of the fingerprint identification units may be seriously degraded.

The disclosed display panel and display device are directed to solve one or more problems set forth above and other problems in the art.

BRIEF SUMMARY OF THE DISCLOSURE

One aspect of the present disclosure provides a display panel. The display panel includes an array substrate including a plurality of organic light-emitting structures, and at least one fingerprint identification unit configured to identity a fingerprint based on light reflected by a touch object to the at least one fingerprint identification unit. An organic light-emitting structure has a first side facing the array substrate and an opposing second side, and the at least one fingerprint identification unit is disposed in a display region on the first side of the organic light-emitting structure. The display panel also includes a plurality of spacers and a plurality of anti-crosstalk pads. An orthogonal projection of each spacer onto the array substrate is disposed between orthogonal projections of adjacent organic light-emitting structures onto the array substrate. An anti-crosstalk pad is disposed between a corresponding spacer and the at least one fingerprint identification unit. An orthogonal projection of the anti-crosstalk pad onto the array substrate include a first region, and the first region overlaps with the orthogonal projection of the spacer onto the array substrate. The anti-crosstalk pad blocks light scattered by the spacer from entering the at least one fingerprint identification unit.

Another aspect of the present disclosure provides a display device. The display device includes a display panel. The display panel includes an array substrate including a plurality of organic light-emitting structures, and at least one fingerprint identification unit configured to identity a fingerprint based on light reflected by a touch object to the at least one fingerprint identification unit. An organic light-emitting structure has a first side facing the array substrate and an opposing second side, and the at least one fingerprint identification unit is disposed in a display region on the first side of the organic light-emitting structure. The display panel also includes a plurality of spacers and a plurality of anti-crosstalk pads. An orthogonal projection of each spacer onto the array substrate is disposed between orthogonal projections of adjacent organic light-emitting structures onto the array substrate. An anti-crosstalk pad is disposed between a corresponding spacer and the at least one fingerprint identification unit. An orthogonal projection of the anti-crosstalk pad onto the array substrate include a first region, and the first region overlaps with the orthogonal projection of the spacer onto the array substrate. The anti-crosstalk pad blocks light scattered by the spacer from entering the at least one fingerprint identification unit.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
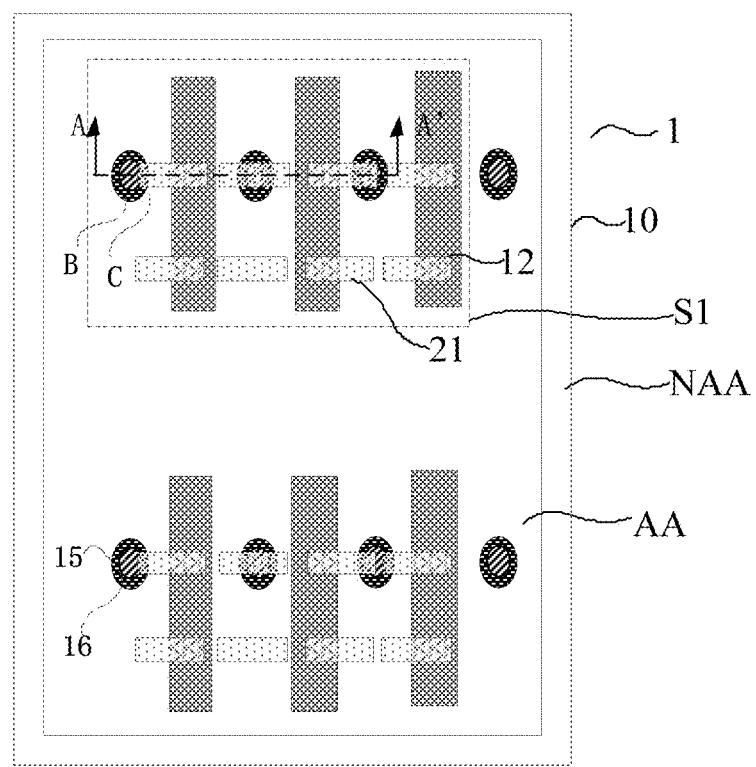
FIG. 1 illustrates a schematic top view of an exemplary display panel consistent with disclosed embodiments.

Reference will now be made in detail to exemplary embodiments of the disclosure, which are illustrated in the accompanying drawings. It should be understood that the specific embodiments described herein are only used to explain the present disclosure rather than to limit the present disclosure. In addition, it should also be noted that, for the convenience of description, only some but not all structures related to the present disclosure are shown in the accompanying drawings. Throughout the present specification, the same or similar reference numbers represent the same or similar structures, elements or processes. It should be noted that, in the case that no conflict is involved, the embodiments in the present disclosure and the features in the embodiments may be combined with each other.

As discussed in the background, a fingerprint is a mark made by the pattern of ridges on the pad of a human finger, which is innate and unique for everyone. Thus, we can associate a person with his fingerprints, by comparing his fingerprints and pre-stored fingerprint data to verify his true identity, which is called as fingerprint recognition technology. The analysis of fingerprints for matching purposes generally requires the comparison of several features of the print pattern.

Benefiting from the electronic integration manufacturing technology, as well as the prompt and reliable algorithm research, optical fingerprint recognition technology is emerging in our daily life, which has been the most deeply-researched, the most widely used, and the most mature technology in biological detection technology.

The principle of optical fingerprint recognition technology is explained as follows. Light emitted by a light source in a display panel is irradiated to a user's finger, then reflected by the finger to generate reflected light. The reflected light is then transmitted to a plurality of fingerprint identification units, and each fingerprint identification unit collects the optical signal irradiated onto the fingerprint identification unit. Due to the presence of a specific pattern of the fingerprint, the light reflected at different positions of the user's finger has different light intensity, then the fingerprint recognition units collect different light signals, according to which the user's true identity is determined.

However, when the light reflected by a touch object (i.e., the user finger) is transmitted through a plurality of spacers disposed in the display panel, the spacers may scatter the light, such that the light reflected by the same position of the touch object may be irradiated onto different fingerprint identification units. For example, the light reflected by a same ridge or a same valley of the use's finger may be irradiated onto different fingerprint identification units and, thus, the fingerprint identification units that receive the reflected light may be unable to precisely detect the accurate position of the ridge or the valley. Thus, serious crosstalk may be generated during the fingerprint identification process and, accordingly, the identification accuracy and precision of the fingerprint identification units may be degraded.

The present disclosure provides an improved display panel capable of improving the identification accuracy and precision of the fingerprint identification units.

Figure 2:
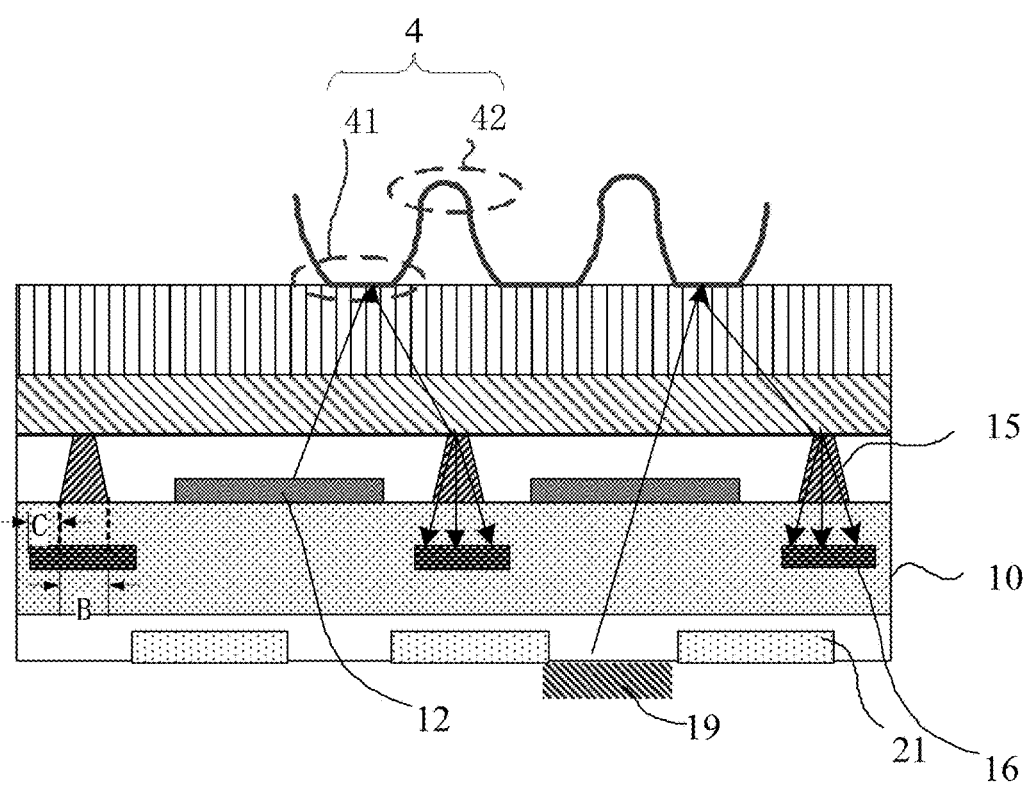
FIG. 2 illustrates an exemplary AA' sectional view of an exemplary display panel in FIG. 1.

FIG. 1 illustrates a schematic top view of an exemplary display panel 1 consistent with disclosed embodiments. FIG. 2 illustrates an exemplary AA' sectional view of an exemplary display panel in FIG. 1.

As shown in FIG. 1 and FIG. 2, the display panel 1 may include an array substrate 10, a plurality of organic light-emitting structures 12, a plurality of fingerprint identification units 21, a plurality of spacers 15, and a plurality of anti-crosstalk pads 16.

In one embodiment, the plurality of organic light-emitting structures 12 may be disposed on the array substrate 10. The organic light-emitting structure 12 may have a first side facing/adjacent to the array substrate 10, and an opposing second side far away from the array substrate 10. The fingerprint identification unit 21 may be disposed in a display region AA on the first side of the organic light-emitting structure 12, i.e., the side facing/adjacent to the array substrate 10. The fingerprint identification units 21 may be configured to identify fingerprints, according to the light reflected to the fingerprint identification unit 21 by the touch object 4.

When being projected onto the array substrate 10, an orthogonal projection of the spacer 15 may be disposed between orthogonal projections of adjacent organic light-emitting structures 12. In one embodiment, as shown in FIG. 2, the orthogonal projection of the spacer 15 may be disposed between the orthogonal projections of two adjacent organic light-emitting structures 12. The anti-crosstalk pad 16 may be disposed between a corresponding spacer 15 and a fingerprint identification unit 21. The plurality of spacers 15 may be one-to-one corresponding to the plurality of anti-crosstalk pads 16. When being projected onto the array substrate 10, an orthogonal projection of the anti-crosstalk pad 16 onto the array substrate 10 may include a first region B, and the first region B may overlap with the orthogonal projection of the corresponding spacer 15. The anti-crosstalk pad 16 may be configured to block/prevent the light scattered by the corresponding spacer 15 from entering the fingerprint identification units 21. In one embodiment, as shown in FIG. 1, when being projected onto the array substrate 10, the first region B may completely overlap with the orthogonal projection of the corresponding spacer 15.

In one embodiment, the touch object 4 may be a user's finger. The fingerprint consists of a series of ridges 41 and valleys 42 located on the skin surface of the fingertip. Because the distances from the ridge 41 and the valley 42 to the fingerprint identification unit 21 are different, the light reflected by the ridge 41 and received by the fingerprint identification unit 21 may have a light intensity different from the light reflected by the valley 42 and received by the fingerprint identification unit 21. Therefore, the magnitude of the current signal converted from the light reflected by the ridge 41 may be different from the magnitude of the current signal converted from the light reflected by the valley 42. Accordingly, the fingerprint may be identified based on the magnitudes of the current signals. In certain embodiments, the touch object 4 may be a palm or any other appropriate part of the user's body with skin lines and, accordingly, the pattern of the palm or the other part of the user's body with skin lines may be utilized for achieving the function of detection and identification.

In the disclosed embodiments, by arranging the anti-crosstalk pad 16 between the spacer 15 and the fingerprint identification unit 21, the light scattered by the corresponding spacer 15 may be prevented from entering the fingerprint identification unit 21, and the light reflected from a same position of the touch object may be prevented from being irradiated onto different fingerprint identification units 21. Thus, the crosstalk may be suppressed, and the accuracy and precision of fingerprint identification may be improved.

Figure 3:
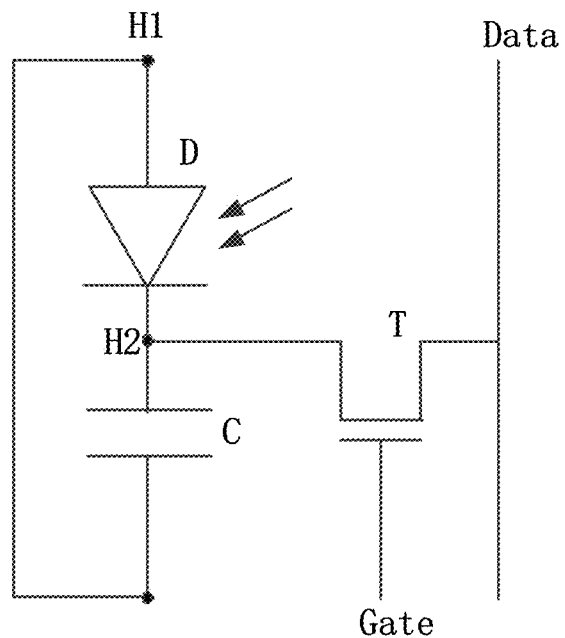
FIG. 3 illustrates an exemplary circuit diagram of an exemplary fingerprint identification unit consistent with disclosed embodiments.
Figure 4:
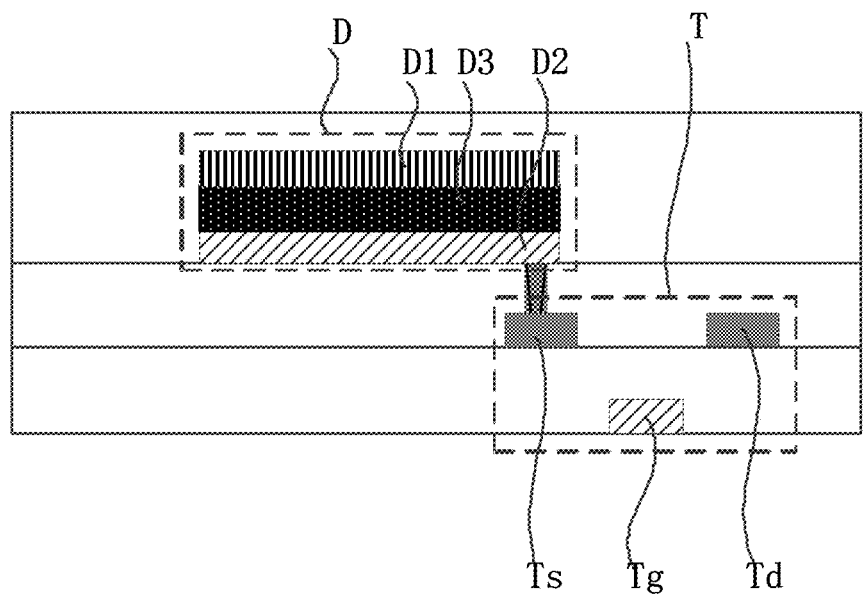
FIG. 4 illustrates a schematic view of exemplary film layers in an exemplary fingerprint identification unit consistent with disclosed embodiments.

FIG. 3 illustrates an exemplary circuit diagram of an exemplary fingerprint identification unit consistent with disclosed embodiments, and FIG. 4 illustrates a schematic view of exemplary film layers in an exemplary fingerprint identification unit consistent with disclosed embodiments.

As shown in FIGS. 2-4, the fingerprint identification unit 21 may include a photodiode D, a storage capacitor C, and a thin-film transistor (TFT) T. An anode D1 of the photodiode D may be electrically connected to a first electrode of the storage capacitor C. A cathode D2 of the photodiode D may be electrically connected to a second electrode of the storage capacitor C and a source electrode Ts of the thin-film transistor T. A gate electrode Tg of the thin-film transistor T may be electrically connected to a switch control line Gate. A drain electrode Td of the thin-film transistor T may be electrically connected to a signal detection line Data. The photodiode D may be used to convert the light reflected by the touch object 4 into a current signal.

In particular, the photodiode D may include a PIN junction D3 between the anode D1 and the cathode D2, and the orthogonal projection of the PIN junction D3 onto the array substrate 10 may be disposed in a light-transmission region of the array substrate. The PIN junction D3 may be formed by a P-type semiconductor, an N-type semiconductor, and an intrinsic semiconductor (I-type layer) between the P-type semiconductor and the N-type semiconductor. The PIN junction D3 may be a photo-sensitive part of the photodiode D. Through configuring the orthogonal projection of the PIN junction D3 onto the array substrate 10 to be in the light-transmission region of the array substrate 10, the photodiode D may have the largest photo-sensitive area to receive the light reflected by the fingerprint and, thus, the accuracy of fingerprint identification may be improved.

In one embodiment, the cathode D2 may be formed by an opaque metal, and the edge of the PIN junction D3 may not exceed the edge of the cathode D2. The PIN junction D3 may have a first side facing the array substrate 10, and an opposing second face far away from the array substrate 10. The anode of the photodiode D may be disposed on the second side of the PIN junction D3. The PIN junction D3 may demonstrate photosensitive properties and may be unidirectional/unilateral conducting. Without light irradiation, the PIN junction D3 may have a substantially small saturated reverse leakage current, i.e., a dark current and, accordingly, the photodiode D may be turned off. Under light irradiation, the saturated reverse leakage current of the PIN junction D3 may be greatly increased, forming a photocurrent. In addition, the photocurrent may change as the intensity of the incident light changes.

Further, as shown in FIG. 2, when a finger is pressing the display panel, the ridges 41 of the fingerprint may be in contact with the surface of the display panel, while the valleys of the fingerprint may not be in contact with the surface of the display panel, such that the light incident onto the ridges 41 and the valleys 42 may have different light reflectivity. Accordingly, the light reflected by the ridge 41 and received by the fingerprint identification unit 21 may have a light intensity different from the light reflected by the valley 42 and received by the fingerprint identification unit 21, and the magnitude of the photocurrent converted from the light reflected by the ridge 41 may be different from the magnitude of the photocurrent converted from the light reflected by the valley 42. Thus, the fingerprint may be identified based on the magnitudes of the photocurrents.

In the disclosed embodiments, the plurality of anti-crosstalk pads may be made of any appropriate light-blocking materials, such as metal, or black matrix material.

In one embodiment, as shown in FIG. 1 and FIG. 2, the orthogonal projection of the anti-crosstalk pad 16 onto the array substrate 10 may also include a second region C. The second region C may surround the first region B. Through introducing the second region C in addition to the first region B, more light scattered by the corresponding spacer 15 may be blocked by the anti-crosstalk pad 16, which may further reduce the crosstalk effect and, thus, improve the identification accuracy and precision of the fingerprint identification unit 21.

Figure 5:
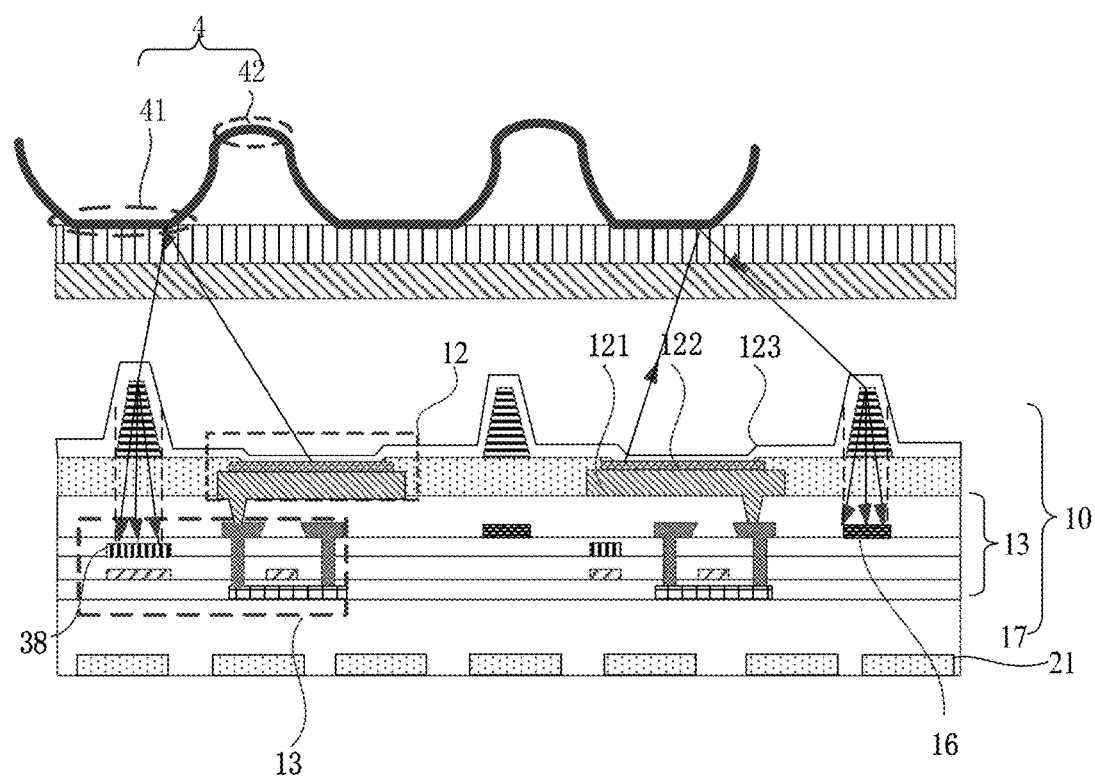
FIG. 5 illustrates another exemplary AA' sectional view of an exemplary display panel in FIG. 1.
Figure 6:
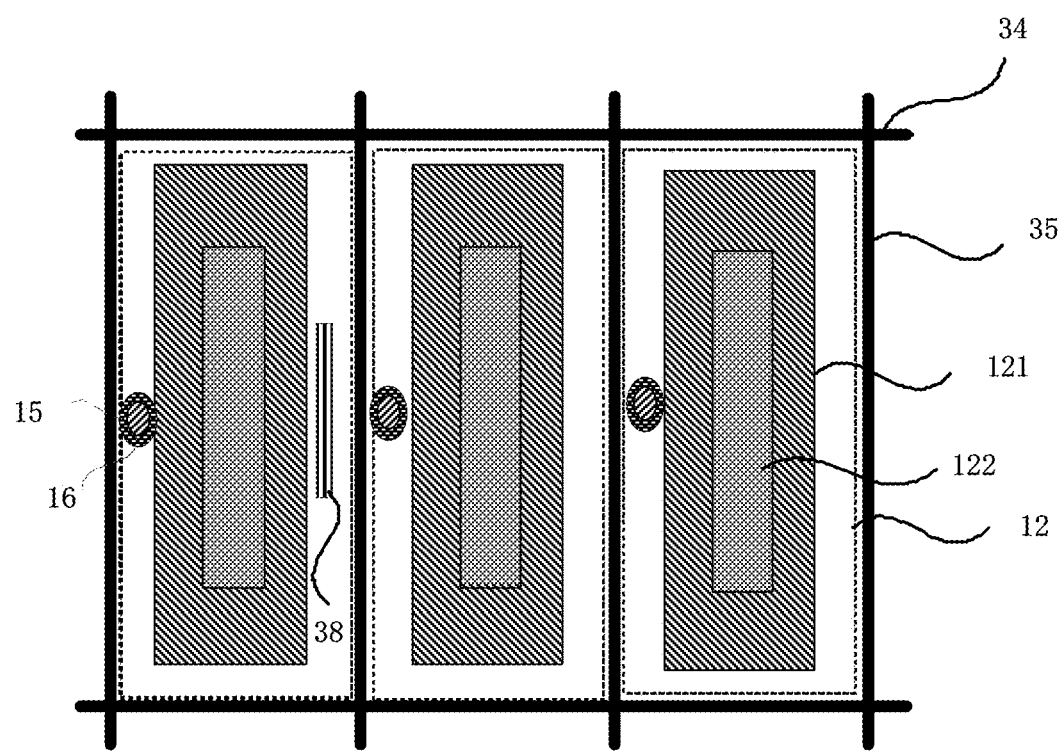
FIG. 6 illustrates an exemplary partial enlarged schematic view of an exemplary region S1 in FIG. 1.

FIG. 5 illustrates another exemplary AA' sectional view of an exemplary display panel in FIG. 1, and FIG. 6 illustrates an exemplary partial enlarged schematic view of an exemplary region S1 in FIG. 1.

As shown in FIG. 5 and FIG. 6, the array substrate 10 may include a plurality of pixel driving circuits 13. Each pixel driving circuit 13 may include a data line 35, a scanning line 34, and a capacitor metal plate 38. The data line 35 and the scanning line 34 may cross/intersect each other but electrically isolated from each other.

In one embodiment, as shown in FIG. 5, the array substrate 10 may also include a second substrate 17, and the plurality of pixel driving circuits 13 may be disposed on the second substrate 17. Each pixel driving circuit 13 may be connected to a corresponding organic light-emitting structure 12. FIG. 5 shows two pixel driving circuits 13, which are for illustrative purposes and not intended to limit the scope of the present disclosure. Each pixel driving circuit 13 may be electrically connected to the reflective electrode 121 in the corresponding organic light-emitting structure 12.

The organic light-emitting structure 12 may also include a light-emitting functional layer 122 and a first electrode 123. The light-emitting functional layer 122 may be arranged between the reflective electrode 121 and the first electrode 123. The light-emitting functional layer 122 may have a first side facing the fingerprint identification unit 21 and an opposing second side far away from the fingerprint identification unit 21. The reflective electrode 121 may be disposed on the first side of the light-emitting functional layer 122.

In one embodiment, the reflective electrode 121 may be an anode, and the first electrode 123 may be a cathode. The light-emitting functional layer 122 may be a red-light emitting layer, a green-light emitting layer, a blue-light emitting layer, or a layer emitting light in any appropriate color. The organic light-emitting structure 12 may also include a hole transport layer (not shown) and an electron transport layer (not shown). The hole transport layer and the electron transport layer may be disposed between the reflective electrode 121 and the first electrode 123, and the light-emitting functional layer 122 may be disposed between the hole transport layer and the electron transport layer.

The light emitting principle of the organic light-emitting structure 12 is explained as follows. When a voltage is applied to the reflective electrode 121 and the first electrode 123, holes from the reflective electrode 121 and electrons from the first electrode 123 may be transmitted to the light-emitting functional layer 122 to form excitons, and the excitons may jump from the excited state to the ground state to generate light. Accordingly, the light-emitting functional layer 122 may emit light.

Figure 7:
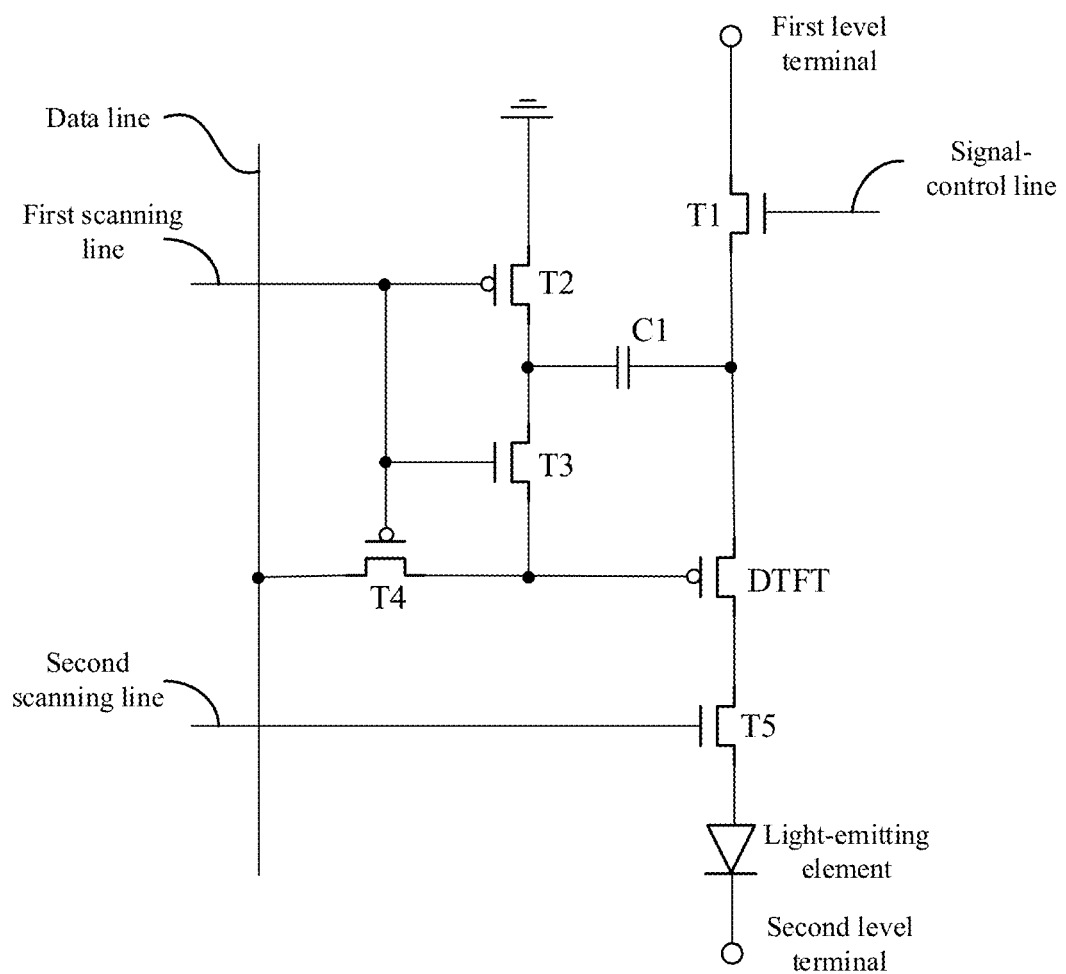
FIG. 7 illustrates a schematic diagram of an exemplary pixel driving circuit consistent with disclosed embodiments.
Figure 8:
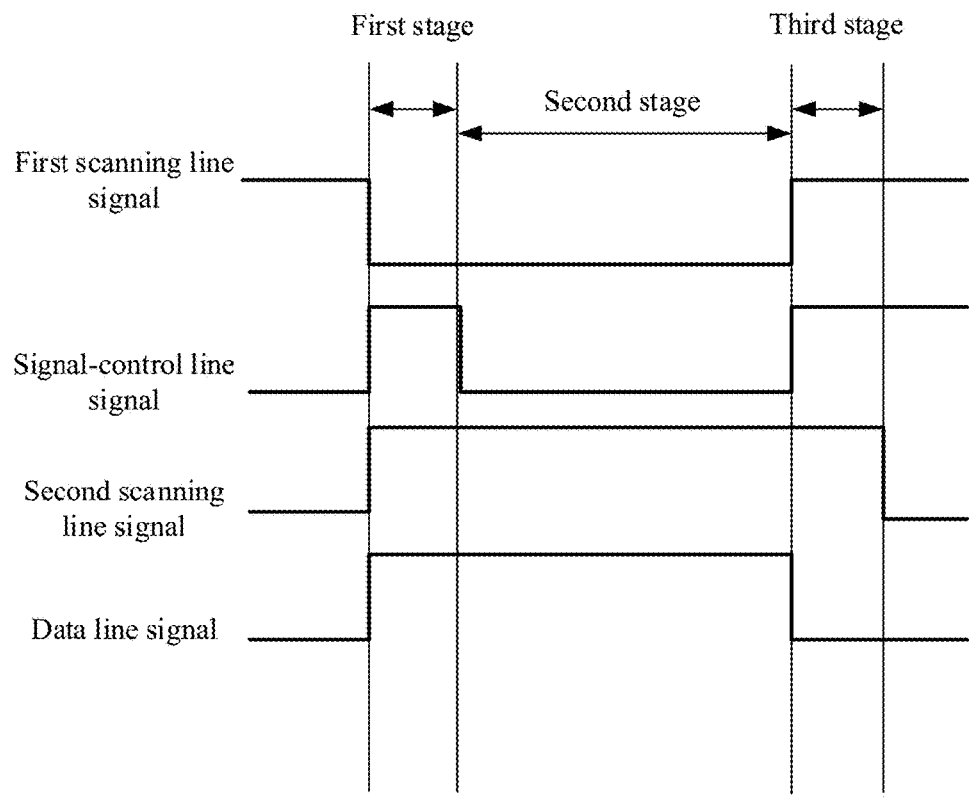
FIG. 8 illustrates an exemplary signal timing sequence for an exemplary pixel driving circuit consistent with disclosed embodiments.

FIG. 7 illustrates a schematic diagram of an exemplary pixel driving circuit consistent with disclosed embodiments, and FIG. 8 illustrates an exemplary signal timing sequence for an exemplary pixel driving circuit consistent with disclosed embodiments.

As shown in FIG. 7, the pixel driving circuit may include a data line, a first scanning line, a second scanning line, a signal-control line, a light-emitting element, a storage capacitor C1, a driving transistor DTFT, and five switching transistors (T1-T5).

In one embodiment, referring to FIGS. 6-7, the scanning line 34 shown in FIG. 6 may be the signal-control line, the first scanning line or the second scanning line of the pixel driving circuit shown in FIG. 7, the data line 35 shown in FIG. 6 may be the data line of the pixel driving circuit shown in FIG. 7, and the capacitor metal plate 38 shown in FIG. 6 may be the storage capacitor C1 shown in FIG. 7.

As shown in FIG. 7, the gate electrode of the first switching transistor T1 may be electrically connected to the signal-control line, the source electrode of the first switching transistor T1 may be electrically connected to a first level terminal, and the drain electrode of the first switching transistor T1 may be electrically connected to the first electrode of the storage capacitor C1. The gate electrode of the second switching transistor T2 may be electrically connected to the first scanning line, the source electrode of the second switching transistor T2 may be electrically connected to the ground, and the drain electrode of the second switching transistor T2 may be electrically connected to the second electrode of the storage capacitor C1.

The gate electrode of the third switching transistor T3 may be electrically connected to the first scanning line, and the source electrode of the third switching transistor T3 may be electrically connected to the second electrode of the storage capacitor C1. The gate electrode of the fourth switching transistor T4 may be electrically connected to the first scanning line, the source electrode of the fourth switching transistor T4 may be electrically connected to the data line, and the drain electrode of the fourth switching transistor T4 may be electrically connected to the drain electrode of the third switching transistor T3. The gate electrode of the driving transistor DTFT may be electrically connected to the drain electrode of the fourth switching transistor T4, and the source electrode of the driving transistor DTFT may be electrically connected to the first electrode of the storage capacitor C1.

The gate electrode of the fifth switching transistor T5 may be electrically connected to the second scanning line, the source electrode of the fifth switching transistor T5 may be electrically connected to the drain electrode of the driving transistor DTFT, and the drain electrode of the fifth switching transistor T5 may be electrically connected to one terminal of the light-emitting element. Moreover, the other terminal of the light-emitting element may be connected to a second level terminal.

In one embodiment, the first switching transistor T1, the third switching transistor T3, and the fifth switching transistor T5 may be N-type switching transistors, and the driving transistor DTFT, the second switching transistor T2, and the fourth switching transistor T4 may be P-type switching transistors.

As shown in FIG. 8, the driving method for the pixel driving circuit may include the following stages.

At the first stage, the first switching transistor T1, the second switching transistor T2, the fourth switching transistor T4, and the fifth switching transistor T5 may be turned on, while the third switching transistor T3 may be turned off, such that the first level terminal may charge the storage capacitor C1.

At the second stage, the second switching transistor T2, the fourth switching transistor T4, and the fifth switching transistor T5 may be turned on, while the first switching transistor T1 and the third switching transistor T3 may be turned off. The storage capacitor C1 may then be discharged until the voltage difference between the gate electrode and the source electrode of the driving transistor DTFT becomes equal to the threshold voltage of the driving transistor DTFT.

At the third stage, the first switching transistor T1, the third switching transistor T3, the fifth switching transistor T5 may be turned on, while the second switching transistor T2 and the fourth switching transistor T4 may be turned off, such that the first level terminal and the second level terminal may together apply a turn-on signal to the light-emitting element.

The fifth switching transistor T5 may be turned off to protect the light-emitting element after the image display is completed.

In one embodiment, at least one of the data line, the scanning line, and the capacitor metal plate of the pixel driving circuit may be individually multiplexed as an anti-crosstalk pad. A corresponding structure is shown in FIG. 9.

Figure 9:
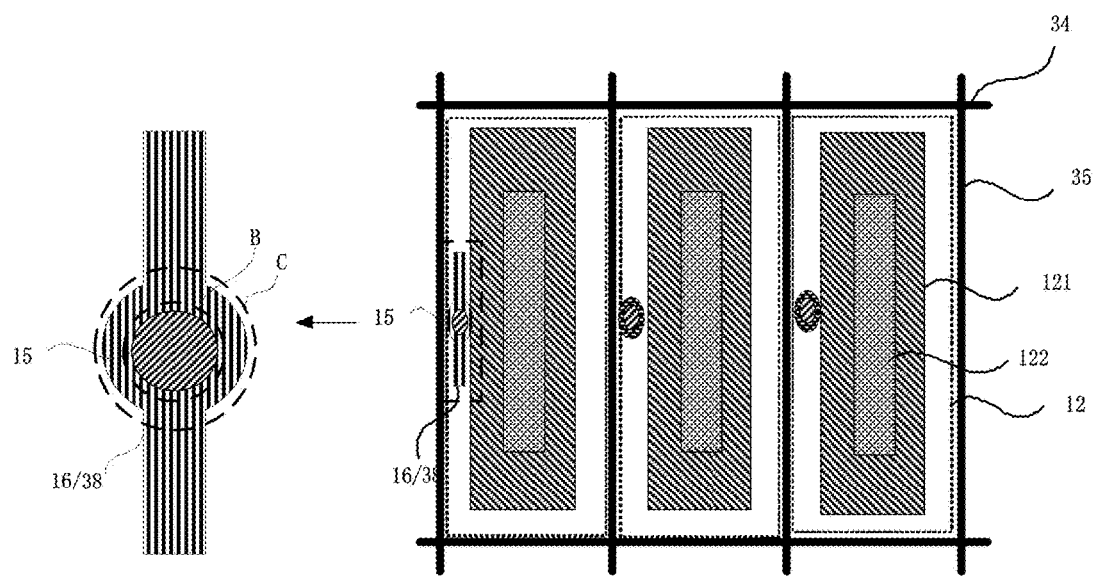
FIG. 9 illustrates another exemplary partial enlarged schematic view of an exemplary region S1 in FIG. 1.

FIG. 9 illustrates another partial enlarged schematic view of an exemplary region S1 in FIG. 1. For illustrative purpose, the capacitor metal plate 38 in FIG. 9 may be multiplexed as an anti-crosstalk pad. An enlarged view of the capacitor metal plate 38 is also shown in FIG. 9.

In one embodiment, as shown in FIG. 5 and FIG. 9, the orthogonal projection of the capacitor metal plate 38 onto the array substrate 10 may include a first region B, and the first region B may overlap with the orthogonal projection of the corresponding spacer 15 onto the array substrate 10. That is, the capacitor metal plate 38 may be multiplexed as an anti-crosstalk pad which blocks the light scattered by the spacer 15 from entering the fingerprint identification unit 21.

In another embodiment, the orthogonal projection of the capacitor metal plate 38 onto the array substrate 10 may also include a second region C. The second region C may surround the first region B. The second region C may further block the light scattered by the spacer 15 from entering the fingerprint identification unit 21.

In certain embodiments, the data line and/or the scanning line of the pixel driving circuit may be multiplexed as the anti-crosstalk pad of the display panel. The orthogonal projection of the data line and/or the scanning line of the pixel driving circuit may include a first region, and the first region may overlap with the orthogonal projection of the corresponding spacer 15 onto the array substrate. That is, the data line and/or the scanning line may be multiplexed as the anti-crosstalk pad to block the light scattered by the corresponding spacer 15 from entering the fingerprint identification units.

In certain other embodiments, the orthogonal projection of the data line and/or scanning line of the pixel driving circuit may also include a second region. The second region may surround the first region, such that the light scattered by the spacers may be further blocked from entering the fingerprint identification units.

In the disclosed embodiments, through individually multiplexing at least one of the data line, the scanning line, and the capacitor metal plate of the pixel driving circuit as the anti-crosstalk pad, the precision of fingerprint detection may be improved, the manufacturing process may be simplified, and the cost may also be reduced.

In another embodiment, the data line, the scanning line, and the capacitor metal plate of the pixel driving circuit may be combined in any appropriate forms to together form the anti-crosstalk pad. A corresponding structure is shown in FIG. 10.

Figure 10:
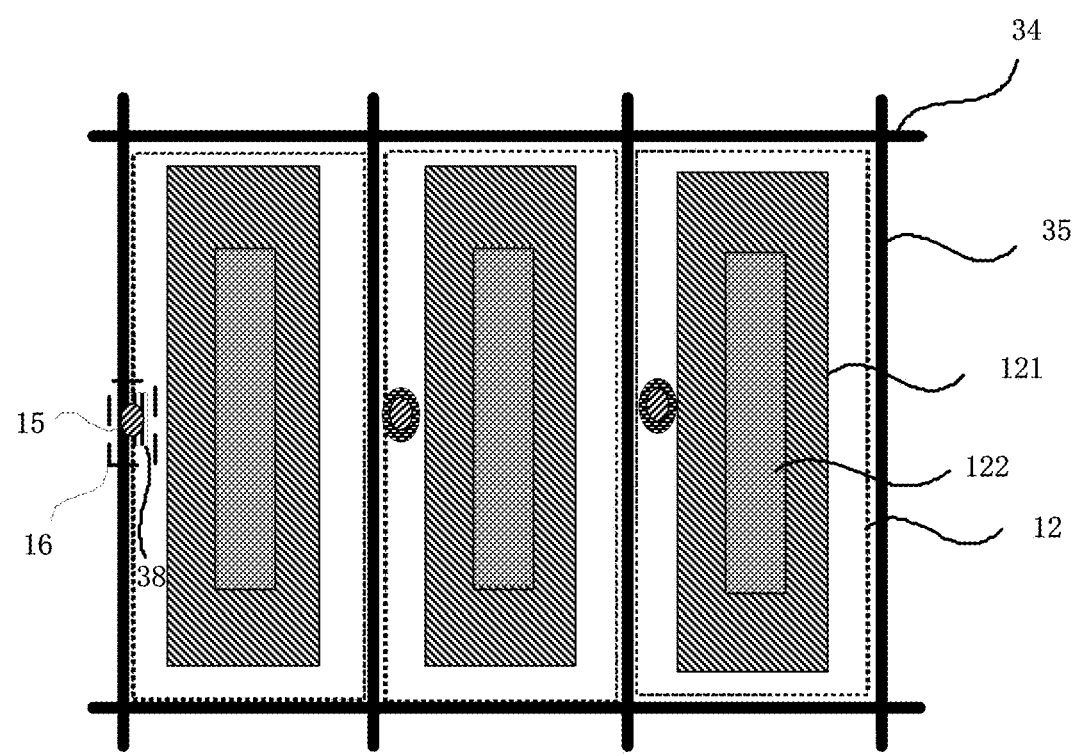
FIG. 10 illustrates another exemplary partial enlarged schematic view of an exemplary region S1 in FIG. 1.

FIG. 10 illustrates another partial enlarged schematic view of an exemplary region S1 in FIG. 1. As shown in FIG. 10, the combination of the data line 35 and the capacitor metal plate 38 may form the anti-crosstalk pad 16, in which the combination refers to that the orthogonal projection of the data line 35 onto the array substrate overlaps with the orthogonal projection of the capacitor metal plate 38 onto the array substrate. The orthogonal projection of the data line 35 and the capacitor metal plate 38 onto the array substrate may form a first region, and the first region may overlap with the orthogonal projection of the spacer 15. Therefore, the data line 35 and the capacitor metal plate 38 may together be multiplexed as the anti-crosstalk pad 16 to block the light scattered by the spacer 15 from entering the fingerprint identification units.

In addition to multiplexing the data line together with the capacitor metal plate as the anti-crosstalk pad, the data line together with the scanning line, the capacitor metal plate together with the scanning line, or the data line, the scanning line together with the capacitor metal plate may also be multiplexed as the anti-crosstalk pad for blocking the light scattered by the spacer 15 from entering the fingerprint identification units.

Therefore, the disclosed display panels may not only improve the precision of fingerprint detection, but also simplify the manufacturing process, thereby saving the cost.

It should be noted that the data line, the scanning line, and the capacitor metal plate in the pixel driving circuit are electrically isolated from each other. Moreover, as shown in FIG. 5, in addition to the anti-crosstalk pad which may be individually multiplexed as at least one of the data line, the scanning line, and the capacitor metal plate of the pixel driving circuit, the disclosed display panel may further include another anti-crosstalk pad which is different from the data line, the scanning line, and the capacitor metal plate of the pixel driving circuit.

In one embodiment, the display panel may have an anti-crosstalk pad different from the data line, the scanning line, and the capacitor metal plate of the pixel driving circuit. Moreover, the anti-crosstalk pad may be arranged in a layer different from at least one of the layers where the data line, the scanning line, and the capacitor metal plate of the driving circuit are arranged. That is, the anti-crosstalk pad may not be arranged in a same layer as at least one of the data line, the scanning line, and the capacitor metal plate. When being projected on to the array substrate, the orthogonal projection of the data line, the scanning line, or the capacitor metal plate of the driving circuit may overlap with or may be connected to the orthogonal projection of the anti-crosstalk pad. A corresponding structure is shown in FIG. 11.

Figure 11:
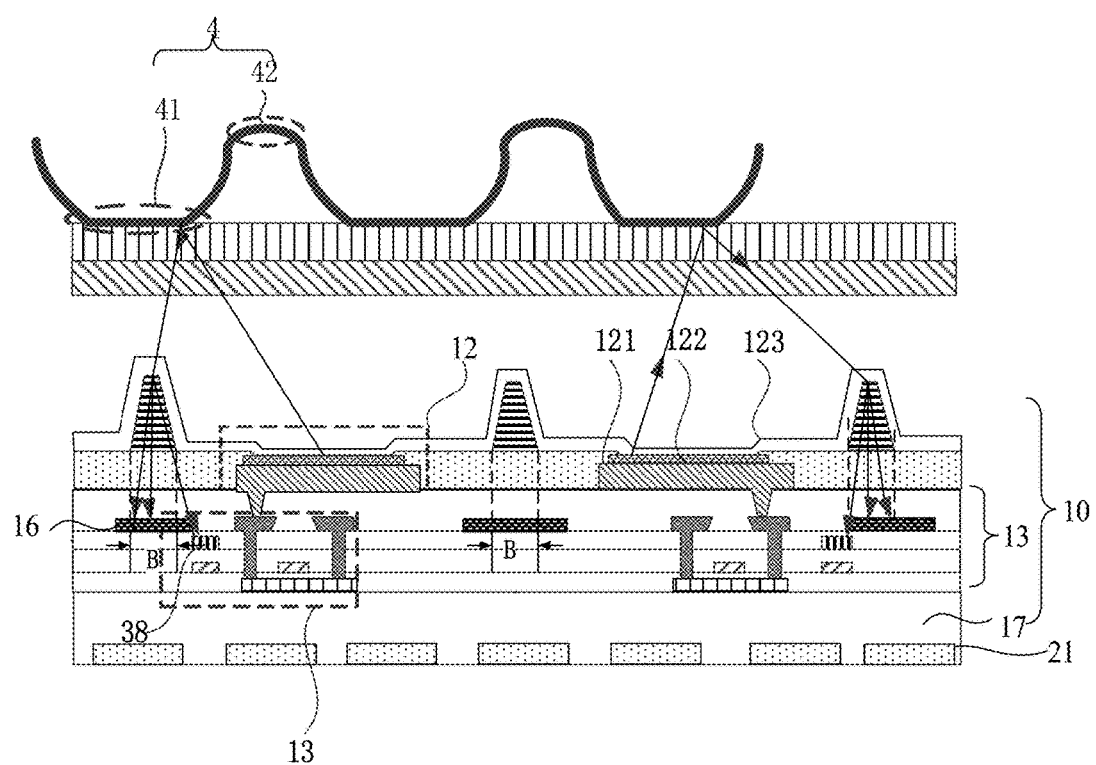
FIG. 11 illustrates another exemplary AA' sectional view of an exemplary display panel in FIG. 1.

FIG. 11 illustrates another exemplary AA' sectional view of an exemplary display panel in FIG. 1. As shown in FIG. 11, when being projected onto the array substrate 10, the orthogonal projections of the anti-crosstalk pad 16 and the capacitor metal plate 38 may be connected to each other to form a region, which is overlapping with or greater than the orthogonal projection of a corresponding spacer 15. Therefore, in addition to configuring the anti-crosstalk pad 16 to block the light scattered by the spacer 15, the capacitor metal plate 38 may be configured to further shield the light scattered by the spacer 15. Accordingly, the precision of fingerprint detection may be further improved.

In the existing technology, light reflected from different positions of the touch object may be irradiated onto a same fingerprint identification unit. For example, the light reflected by a ridge and a valley of the touch object may irradiated onto a same fingerprint identification unit and, thus, the fingerprint identification unit that receives the light may not be able to precisely detect the positions for the ridge and the valley of the fingerprint, respectively. Therefore, serious crosstalk may be generated during the fingerprint identification process and, accordingly, the accuracy and precision of fingerprint identification may be degraded.

In view of this, in one embodiment, the display panel may also include an angle-confinement film. The angle-confinement film may be disposed between the anti-crosstalk pad and the fingerprint identification unit. A corresponding structure is shown in FIG. 12.

Figure 12:
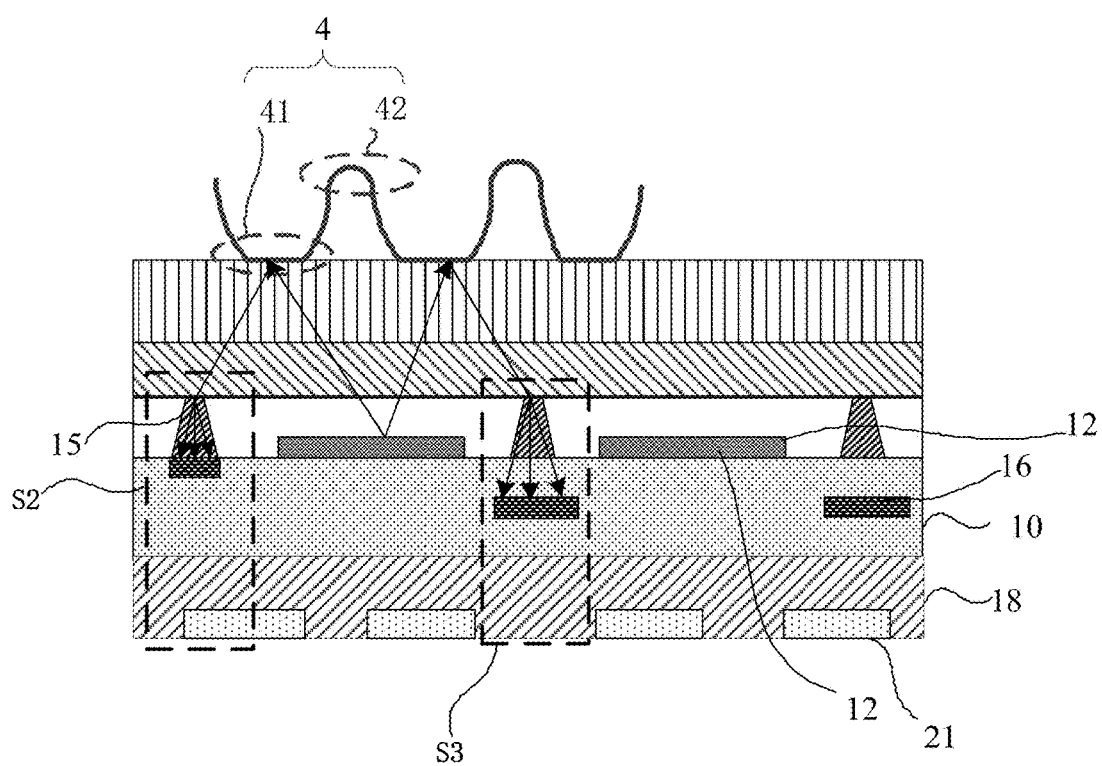
FIG. 12 illustrates another exemplary AA' sectional view of an exemplary display panel in FIG. 1.

FIG. 12 illustrates another exemplary AA' sectional view of an exemplary display panel in FIG. 1. The similarities between FIG. 12 and FIG. 2 are not repeated here, while certain differences may be explained. As shown in FIG. 12, the display panel may also include an angle-confinement film 18 between the anti-crosstalk pad 16 and the fingerprint identification unit 21.

In one embodiment, by arranging the angle-confinement film 18 between the anti-crosstalk pad 16 and the fingerprint identification unit 21, light reflected by the touch object 4 with an incident angle with respect to the angle-confinement film 18 greater than the transmission angle of the angle-confinement film 18 may be filtered out and, thus, may not be irradiated onto the fingerprint identification unit 21. As discussed above, in the existing technology, light reflected at different positions of the touch object 4 may be irradiated onto a same fingerprint identification unit 21. For example, light reflected by a ridge 41 and a valley 42 at different positions of the touch object 4 may be irradiated onto a same fingerprint identification unit 21. Thus, crosstalk may be generated during the fingerprint identification process. Compared to the existing technology, in the disclosed embodiments, by introducing the angle-confinement film 18 to filter out the light with an incident angle greater than the transmission angle of the angle-confinement film 18, the display panel may be able to efficiently prevent the crosstalk caused by light from different positions of the touch object 4 being reflected to a same fingerprint identification unit 21. Therefore, the disclosed display panel may improve the accuracy and precision of fingerprint identification.

In one embodiment, referring to FIG. 12, the display panel may include the angle-confinement film 18. Light normally incident onto the angle-confinement film has a light transmittance of A, and the transmission angle of the angle-confinement film is defined as an incident angle of light, which has a light transmittance of kA, with respect to the angle-confinement film, where 0<k<1. That is, light, which is incident on the angle-confinement film 18 and has an incident angle equal to the transmission angle, may have the light transmittance of kA. Further, light, which is incident on the angle-confinement film 18 and has an incident angle smaller than the transmission angle, may have a light transmittance greater than kA, while light, which is incident on the angle-confinement film 18 and has an incident angle greater than the transmission angle, may have a light transmittance smaller than kA.

By setting the value of k, light, which is reflected by the touch object 4 to be incident onto the angle-confinement film 18 and has an incident angle smaller than the transmission angle of the angle-confinement film 18, may be regarded as the detection light for fingerprint identification. Meanwhile, light, which is reflected by the touch object 4 to be incident onto the angle-confinement film 18 and has an incident angle greater than the transmission angle of the angle-confinement film 18, may still be transmitted through the angle-confinement film 18 and enter the fingerprint identification unit 21. However, the light with the incident angle greater than the transmission angle of the angle-confinement film 18 may only form a background pattern with a weak intensity in the subsequently-formed fingerprint identification image. Therefore, the detection light for fingerprint identification, i.e., the fingerprint identification image formed by the light with incident angles with respect to the angle-confinement film 18 smaller than the transmission angle of the angle-confinement film 18, may still be clearly identified.

As compared to the existing technology, in which light reflected by different positions of the touch object may be irradiated onto a same fingerprint identification unit and, thus, cause crosstalk during the fingerprint identification process, the disclosed display device may improve the accuracy and precision of the fingerprint identification. Meanwhile, the disclosed display device may also be able to reduce the fabricating difficulty for the angle-confinement film 18 without affecting the reading of the fingerprint.

In one embodiment, as shown in FIG. 12, the display panel may include an angle-confinement film 18. With the angle-confinement film 18, light re which is reflected by the touch object 4 to be incident onto the angle-confinement film 18 and has an incident angle smaller than the transmission angle of the angle-confinement film 18, may have a light transmittance of A1, and light which is reflected by the touch object 4 to be incident onto the angle-confinement film 18 and has an incident angle greater than the transmission angle of the angle-confinement film 18, may have a light transmittance of A2.

Through configuring the values of A1 and A2 to be A1>A2>0, light, which is reflected by the touch object 4 to be incident onto the angle-confinement film 18 and has an incident angle smaller than the transmission angle of the angle-confinement film 18, may be regarded as the detection light for fingerprint identification. Meanwhile, light which is reflected by the touch object 4 to be incident onto the angle-confinement film 18 and has an incident angle greater than the transmission angle of the angle-confinement film 18, may still be transmitted through the angle-confinement film 18 and enter the fingerprint identification unit 21. However, because A1>A2, the light with the incident angle greater than the transmission angle may only form a background pattern with a weak intensity in the subsequently-formed fingerprint identification image. Therefore, the detection light for fingerprint identification, i.e., the fingerprint identification image formed by the light with incident angles with respect to the angle-confinement film 18 smaller than the transmission angle of the angle-confinement film 18, may still be clearly identified.

In the existing technology, light reflected by different positions of the touch object may be irradiated onto a same fingerprint identification unit and, thus, the crosstalk may be generated during the fingerprint identification process. Compared to the existing technology, in the disclosed embodiments, the display device may improve the accuracy and precision of the fingerprint identification. Meanwhile, the disclosed display device may also reduce the fabricating difficulty for the angle-confinement film 18 without affecting the reading of the fingerprint.

Figure 13:
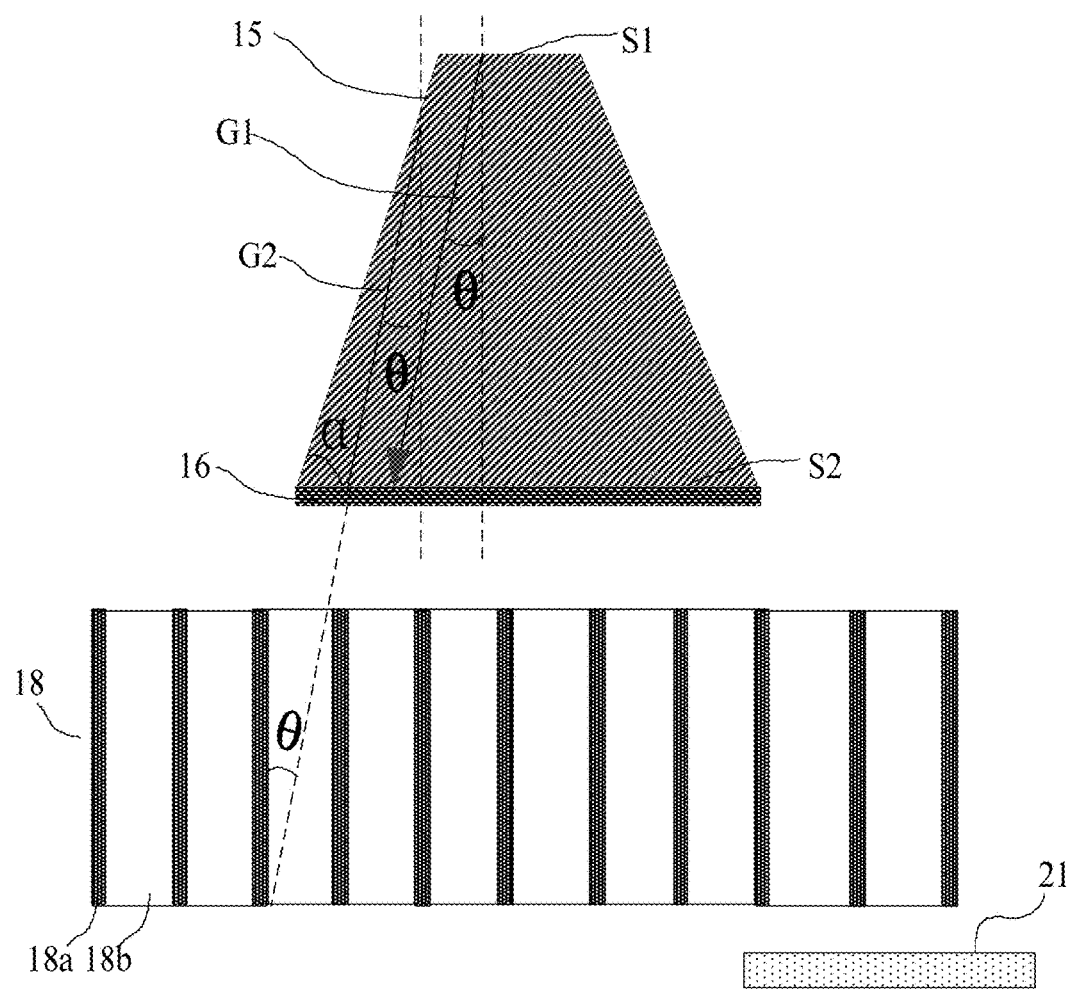
FIG. 13 illustrates a partial enlarged schematic view of an exemplary region S2 in FIG. 12.
Figure 14:
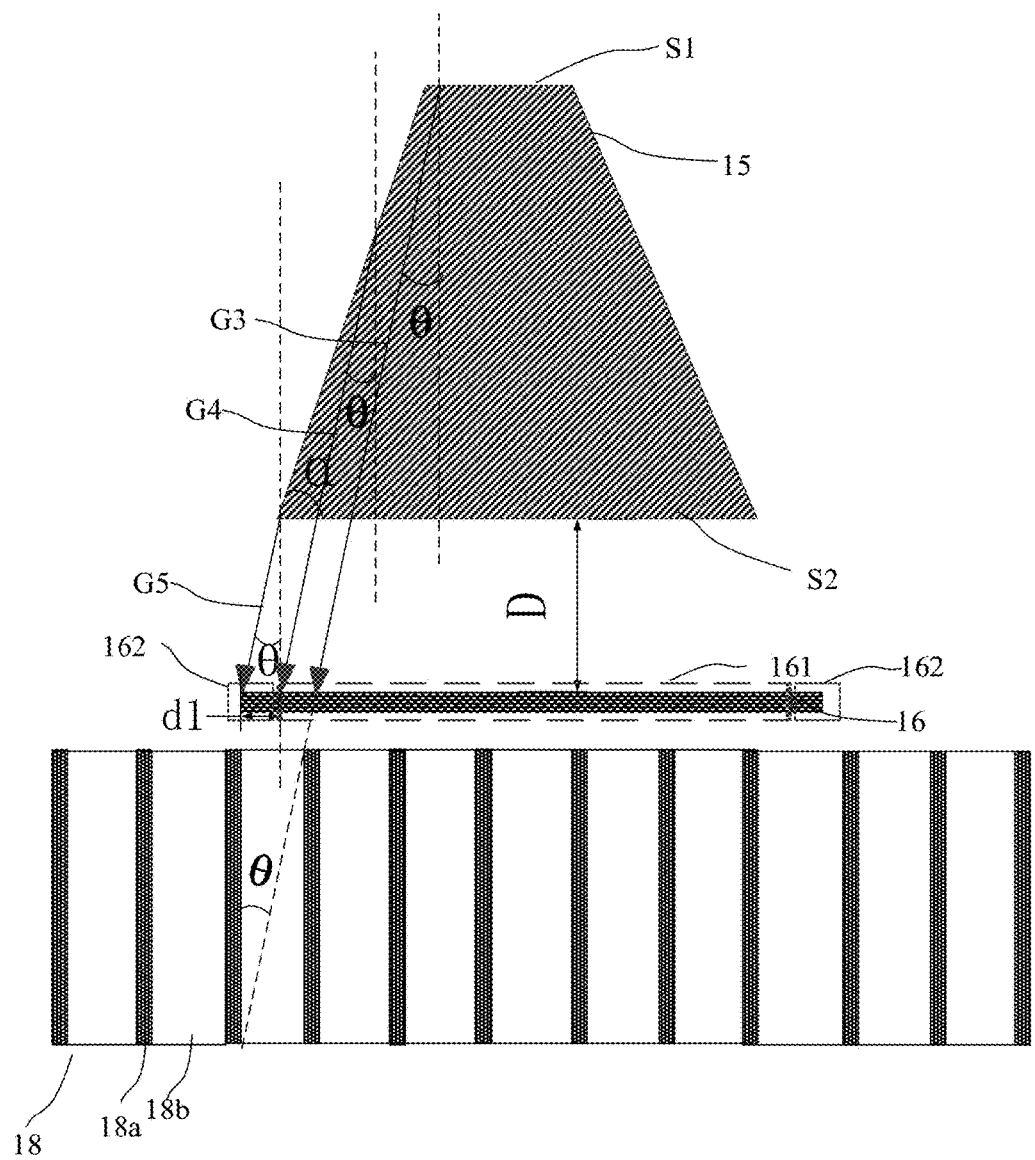
FIG. 14 illustrates a partial enlarged schematic view of an exemplary region S3 in FIG. 12.

FIG. 13 illustrates a partial enlarged schematic view of an exemplary region S2 in FIG. 12, and FIG. 14 illustrates a partial enlarged schematic view of an exemplary region S3 in FIG. 12.

As shown in FIG. 13 and FIG. 14, in one embodiment, the cross section of the spacer 15 may have a trapezoidal shape. The bottom angle of the spacer 15 may be α, the transmission angle of the angle-confinement film 18 may be θ, and the bottom angle α may be smaller than 90°-θ. The angle-refinement film 18 may reduce the influence of the crosstalk light on the fingerprint identification unit 21 by filtering or partially absorbing the light, which is reflected by the touch object to be incident onto the angle-confinement film 18 and has an incident angle greater than the transmission angle θ.

To prevent crosstalk as described above, in one embodiment, the transmission angle θ of the angle-confinement film 18 may be smaller than or equal to approximately 20°. According to the existing technology, after the spacer 15 is formed, the bottom angle α of the cross section of the spacer 15 is often less than approximately 60°. Therefore, the bottom angle α may be smaller than 90°-θ (i.e., 60°<90°-20°). In another embodiment, the transmission angle θ may be approximately greater than or equal to 5° and smaller than or equal to 15°, through which, the fabrication process for the angle-confinement film 18 may be relatively simple and, meanwhile, the crosstalk may be suppressed. Accordingly, the accuracy of fingerprint identification may be improved.

In one embodiment, as shown in FIG. 13, the spacer 15 may include a bottom surface S2 and a top surface S1. The area of the bottom surface S2 may be larger than the area of the top surface S1, and the bottom surface S2 may be arranged closer to the fingerprint identification unit 21 than the top surface S1. The anti-crosstalk pad 16 may be in contact with the bottom surface S2 of the spacer 15. In addition, the anti-crosstalk pad 16 and the bottom surface S2 of the spacer 15 may have an identical area and may completely overlap with each other. Through configuring the anti-crosstalk pad 16 to overlap and contact with the bottom surface S2 of the spacer 15, the disclosed display panel may be able to block the light scattered by the spacer 15 and, thus, the accuracy of the fingerprint detection may be improved.

In particular, as shown in FIG. 13, the anti-crosstalk pad 16 may block the light scattered by the spacer 15 in which the light has an incident angle smaller than or equal to the transmission angle θ. For example, the scattered light G1 and the scattered light G2 each having an incident angle equal to the transmission angle θ may be blocked by the anti-crosstalk pad 16. The scattered light G2 may be equivalent to the scattered light G1 after being translated to the left. Therefore, the anti-crosstalk pad 16 may block the light which is scattered by the spacer 15 to be incident onto the angle-confinement film 18 and has an incident angle equal to the transmission angle θ. Moreover, the anti-crosstalk pad 16 may also block the light which is scattered by the spacer 15 to be incident onto the angle-confinement film 18 and has an incident angle smaller than the transmission angle θ. When the incident angle of the scattered light, which is scattered by the spacer 15 to be incident onto the angle-confinement film 18, is greater than the transmission angle θ and the scattered light is not blocked by the anti-crosstalk pad 16, the angle-refinement film 18 may be able to filter out or partially absorb the scattered light, thereby suppressing the crosstalk.

In certain embodiments, the angle-refinement film 18 may include a plurality of light-absorbing regions 18a and a plurality of light-transmitting regions 18b arranged parallel to the surface of the array substrate. The plurality of light-absorbing regions 18a and the plurality of light-transmitting regions 18b may be alternately arranged along a same direction. Therefore, the interfaces between the plurality of light-absorbing regions 18a and the plurality of light-transmitting regions 18b may be perpendicular to the surface of the array substrate. The light-absorbing region 18a may comprise a light-absorbing material.

In one embodiment, light irradiated onto the light-absorbing region 18a may be absorbed by the light-absorbing material in the light-absorbing region 18a. That is, when light scattered by the touch object is irradiated onto the light-absorbing region 18a, the light may not be transmitted through the angle-confinement film 18 to enter the fingerprint identification unit 21. Thus, the angle-confinement film 18 may be able to effectively filter out the scattered light.

In another embodiment, when light is irradiated to the light-absorbing region 18a, the light-absorbing region 18a may be able to partially absorb the incident light. For example, for light with an incident angle with respect to the angle-confinement film 18 smaller than the transmission angle of the angle-confinement film 18, the light transmittance may be substantially large and, thus, the light may be used for fingerprint detection. That is, the light may be the detection light for fingerprint identification. Moreover, although light with an incident angle with respect to the angle-confinement film 18 larger than the transmission angle of the angle-confinement film 18 may be partially transmitted through the angle-confinement film 18 to enter the fingerprint identification unit 21, the light irradiated to the fingerprint identification unit 21 after passing through the light-absorbing region 18a may form a background pattern with a weak intensity in the subsequently-formed fingerprint identification image and, thus, may not affect the reading of the fingerprint.

Figure 15:
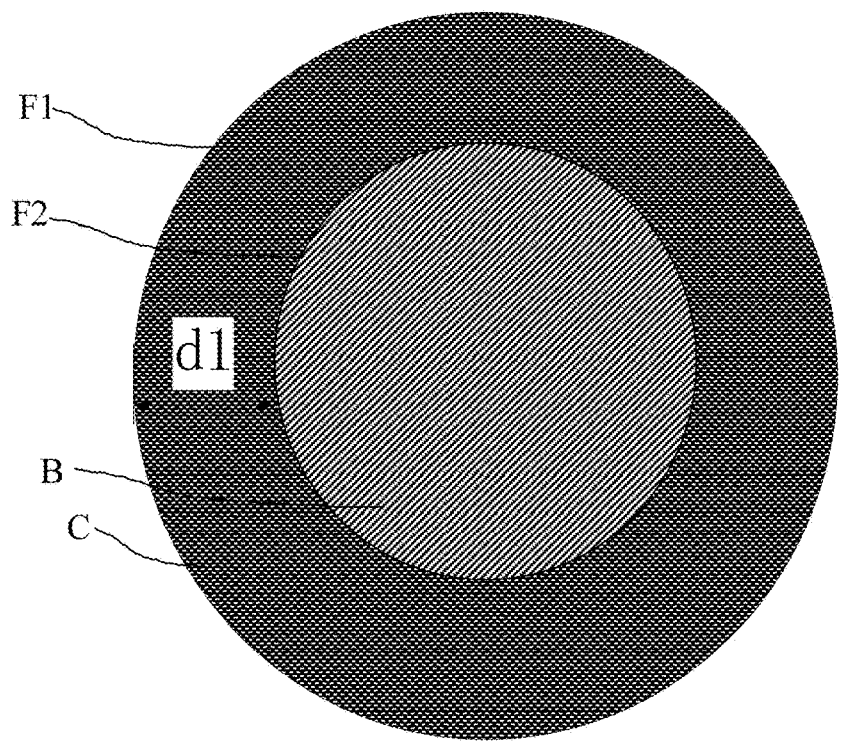
FIG. 15 illustrates a schematic top view of an exemplary region S2 in FIG. 12.

FIG. 15 illustrates a schematic top view of an exemplary region S2 in FIG. 12. As shown in FIG. 14 and FIG. 15, the spacer 15 may include a bottom surface S2 and a first top surface S1. The area of the bottom surface S2 may be larger than the area of the top surface. The vertical distance from the bottom surface S2 of the spacer 15 to the anti-crosstalk pad 16 may be D, where D is greater than 0.

When being projected onto the array substrate, an orthogonal projection of the border of the bottom surface S2 may be disposed in the orthogonal projection of the anti-crosstalk pad 16. The border of the orthogonal projection of the bottom surface S2 onto the array substrate may form a first closed loop F1, and the border of the orthogonal projection of the anti-crosstalk pad 16 onto the array substrate may form a second closed loop F2. For any point of the first closed loop F1, the second closed loop F2 may have a corresponding point providing a shortest distance d1 between the two points (i.e., between the any point of the first closed loop F1 and the corresponding point of the second closed loop F2).

In one embodiment, a set of shortest distances d1 corresponding to all the points of the first closed loop F1 may form a distance range between the first closed loop F1 and the second closed loop F2. The distance range between the first closed loop F1 and the second closed loop F2 may be greater than or equal to $D*\tan\theta$.

In certain embodiments, because the vertical distance D between the bottom surface S2 of the spacer 15 and the anti-crosstalk pad 16 is greater than 0, the scattered light in the spacer 15 may continue to spread after irradiated onto the bottom surface S2. As shown in FIG. 14, the anti-crosstalk pad 16 may include a first pad region 161 and a second pad region 162. The orthogonal projection of the first pad region 161 onto the array substrate may form a first region B. The first region B may overlap with the orthogonal projection of the spacer 15 onto the array substrate. The orthogonal projection of the second pad region 162 onto the array substrate may be a second region C. The second region C may surround the first region B.

Moreover, the first pad region 161 and the second pad region 162 of the anti-crosstalk pad 16 may together block the light scattered by the spacer 15 with an incident angle smaller than or equal to the transmission angle θ. For example, the scattered light G3 and the scattered light G4 each having an incident angle equal to the transmission angle θ may be blocked by the first pad region 161 of the anti-crosstalk pad 16. The scattered light G4 may be equivalent to the scattered light G3 after being translated to the left and, thus, the scattered light G4 may be blocked by the edge section of the first pad region 161 of the anti-crosstalk pad 16.

However, the first pad region 161 may be unable to block the scattered light G5, and the scattered light G5 may be equivalent to the scattered light G4 after being translated to the left. To block the scattered light G5, the anti-crosstalk pad 16 may be configured to further extend on the basis of the first pad region 161 to form a second pad region 162. The scattered light G5 may be the light scattered by the edge of the spacer 15. As shown in FIG. 14, the scattered light G5 may be irradiated onto the anti-crosstalk pad 16 from the edge of the bottom surface S2 of the spacer 15. To suppress the crosstalk, the scattered light G5 may need to be blocked by the second pad region 162 of the anti-crosstalk pad 16. In one embodiment, when the scatted light G5 is irradiated onto the anti-crosstalk pad 16, the distance between the irradiated position on the anti-crosstalk pad 16 and the border of the first pad region 161 may be a distance d2. Therefore, to block the scattered light G5 and, thus, suppress the crosstalk, the shortest distance between the border of the first pad region 161 and the border of the second pad region 162 may be configured to be greater than or equal to the distance d2. When the incident angle of the scattered light is greater than the transmission angle θ and the scattered light is not blocked by the anti-crosstalk pad 16, the angle-confinement film 18 may be able to filter out or partially absorb the scattered light to suppress the crosstalk.

In the disclosed embodiments, by combining the anti-crosstalk pad with the angle-confinement film, light scattered by the spacer 15 may be blocked and, thus, may not be irradiated onto the fingerprint identification units. Therefore, the accuracy of fingerprint identification may be further improved.

In certain embodiments, as shown in FIG. 2, the organic light-emitting structure 12 capable of emitting light may configured as the light source of the fingerprint identification unit 21. The fingerprint identification unit 21 may identify the fingerprint based on the light which is emitted by the organic light-emitting structure 12 and reflected to the fingerprint identification units 21 by the touch object 4.

In certain other embodiments, as shown in FIG. 2, the display panel may also include a fingerprint-identification light source 19. The array substrate 10 may have a first side facing the fingerprint identification units 21, and an opposing second side far away from the fingerprint identification units 21. The fingerprint-identification light source 19 may be disposed on the second side of the array substrate 10. The fingerprint identification unit 21 may identify the fingerprint based on the light which is emitted by the fingerprint-identification light source 19 and reflected to the fingerprint identification units 21 by the touch object 4.

Figure 16:
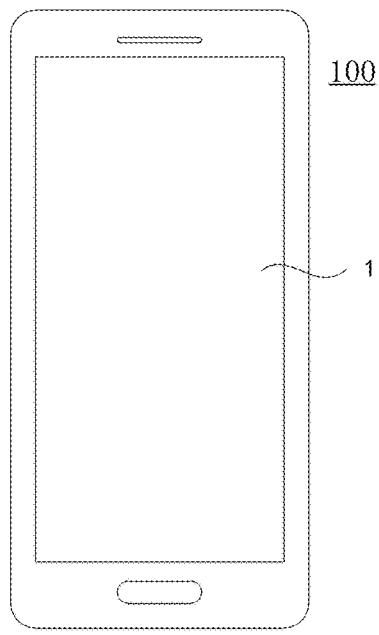
FIG. 16 illustrates an exemplary display device consistent with disclosed embodiments.

The present disclosure also provides a display device. The display device may include any one of the disclosed display panels. FIG. 16 illustrates an exemplary display device consistent with disclosed embodiments. As shown in FIG. 16, the display device 100 may be a mobile phone including a display panel 1. The display panel 1 may be any one of the disclosed display panels. The display device may be a mobile phone, a tablet computer, a notebook computer, a point of sale (POS) machine, an on-car computer, or any other appropriate display terminals, which is not limited by the present disclosure.

The present disclosure provides a display panel. The display panel includes an array substrate including a plurality of organic light-emitting structures, and at least one fingerprint identification unit configured to identity a fingerprint based on light reflected by a touch object to the at least one fingerprint identification unit. An organic light-emitting structure has a first side facing the array substrate and an opposing second side, and the at least one fingerprint identification unit is disposed in a display region on the first side of the organic light-emitting structure. The display panel also includes a plurality of spacers and a plurality of anti-crosstalk pads. An orthogonal projection of each spacer onto the array substrate is disposed between orthogonal projections of adjacent organic light-emitting structures onto the array substrate. An anti-crosstalk pad is disposed between a corresponding spacer and the at least one fingerprint identification unit. An orthogonal projection of the anti-crosstalk pad onto the array substrate include a first region, and the first region overlaps with the orthogonal projection of the spacer onto the array substrate. The anti-crosstalk pad blocks light scattered by the spacer from entering the at least one fingerprint identification unit.

In the existing technology, the spacers arranged in the display panel and the display device scatter the light emitted from the fingerprint-identification light source or the light reflected by the finger and, thus, cause crosstalk on the fingerprint-identification units and degrade the detection accuracy of the fingerprint identification units. According to the disclosed display panel and display device, an anti-crosstalk pad is disposed between a corresponding spacer and the at least one fingerprint identification unit. An orthogonal projection of the anti-crosstalk pad onto the array substrate include a first region, and the first region overlaps with the orthogonal projection of the spacer onto the array substrate. The anti-crosstalk pad blocks light scattered by the spacer from entering the at least one fingerprint identification unit. Therefore, the crosstalk on the fingerprint-identification units caused by the light scattered by the spacer may be suppressed and the accuracy of fingerprint identification may be improved.

The above detailed descriptions only illustrate certain exemplary embodiments of the present disclosure and are not intended to limit the scope of the present disclosure. Those skilled in the art can understand the specification as whole and technical features in the various embodiments can be combined into other embodiments understandable to those persons of ordinary skill in the art. Any equivalent or modification thereof, without departing from the spirit and principle of the present disclosure, falls within the true scope of the present disclosure.

What is claimed is:

1. A display panel, comprising:
an array substrate including a plurality of organic light-emitting structures;
at least one fingerprint identification unit configured to identity a fingerprint based on light reflected by a touch object to the at least one fingerprint identification unit, wherein an organic light-emitting structure has a first side facing the array substrate and an opposing second side, and the at least one fingerprint identification unit is disposed in a display region on the first side of the organic light-emitting structure;
a plurality of spacers, wherein an orthogonal projection of a spacer onto the array substrate is disposed between orthogonal projections of adjacent organic light-emitting structures onto the array substrate; and
a plurality of anti-crosstalk pads, wherein an anti-crosstalk pad is disposed between the spacer and the at least one fingerprint identification unit, an orthogonal projection of the anti-crosstalk pad onto the array substrate includes a first region, the first region overlaps with the orthogonal projection of the spacer onto the array substrate, and the anti-crosstalk pad blocks light scattered by the spacer from entering the at least one fingerprint identification unit.

2. The display panel according to claim 1, wherein:
the orthogonal projection of the anti-crosstalk pad onto the array substrate further includes a second region surrounding the first region.

3. The display panel according to claim 1, wherein:
the array substrate includes a plurality of pixel driving circuits;
a pixel driving circuit includes a data line, a scanning line, and a capacitor metal plate; and
at least one of the data line, the scanning line, and the capacitor metal plate is individually multiplexed as the anti-crosstalk pad.

4. The display panel according to claim 1, wherein:
the array substrate includes a plurality of pixel driving circuits;
a pixel driving circuit includes a data line, a scanning line, and a capacitor metal plate; and
a combination of at least two of the data line, the scanning line, and the capacitor metal plate together forms the anti-crosstalk pad.

5. The display panel according to claim 1, wherein:
the array substrate includes a plurality of pixel driving circuits;
a pixel driving circuit includes a data line, a scanning line, and a capacitor metal plate;
the anti-crosstalk pad is arranged in a layer different from the data line; and
an orthogonal projection of the data line onto the array substrate overlaps with the orthogonal projection of the anti-crosstalk pad.

6. The display panel according to claim 1, wherein:
the array substrate includes a plurality of pixel driving circuits;
a pixel driving circuit includes a data line, a scanning line, and a capacitor metal plate;
the anti-crosstalk pad is arranged in a layer different from the scanning line; and
an orthogonal projection of the scanning line onto the array substrate overlaps with the orthogonal projection of the anti-crosstalk pad.

7. The display panel according to claim 1, wherein:
the array substrate includes a plurality of pixel driving circuits;
a pixel driving circuit includes a data line, a scanning line, and a capacitor metal plate;
the anti-crosstalk pad is arranged in a layer different from the capacitor metal plate; and
an orthogonal projection of the capacitor metal plate line onto the array substrate overlaps with the orthogonal projection of the anti-crosstalk pad.

8. The display panel according to claim 1, further including:
an angle-confinement film disposed between the anti-crosstalk pad and the at least one fingerprint identification unit.

9. The display panel according to claim 8, wherein:
the angle-confinement film filters out light, which is reflected by the touch object to the angle-confinement film and has an incident angle with respect to the angle-confinement film greater than a transmission angle of the angle-confinement film, wherein:

light normally incident onto the angle-confinement film has a light transmittance of A, and the transmission angle of the angle-confinement film is defined as an incident angle of light, having a light transmittance of kA, with respect to the angle-confinement film, where 0<k<1.

10. The display panel according to claim 8, wherein:
light, which is reflected by the touch object and has an incident angle with respect to the angle-confinement film smaller than the transmission angle of the angle-confinement film, has a light transmittance of A1; and
the light, which is reflected by the touch object and has the incident angle with respect to the angle-confinement film greater than the transmission angle of the angle-confinement film, has a light transmittance of A2, where A1>A2>0.

11. The display panel according to claim 9, wherein:
the spacer has a bottom angle α;
the transmission angle of the angle-confinement film is θ; and
the bottom angle α is smaller than 90°-θ.

12. The display panel according to claim 11, wherein:
the transmission angle θ is greater than or equal to approximately 5°, and smaller than or equal to approximately 15°.

13. The display panel according to claim 11, wherein:
the spacer includes a bottom surface and a top surface, wherein an area of the bottom surface is greater than an area of the top surface, and the bottom surface is closer to the at least one fingerprint identification unit than the top surface;
the anti-crosstalk pad has a same area as the bottom surface; and
the anti-crosstalk pad is in contact with the bottom surface.

14. The display panel according to claim 11, wherein:
the spacer includes a bottom surface and a top surface, wherein an area of the bottom surface is greater than an area of the top surface, and a vertical distance from the bottom surface of the spacer to the anti-crosstalk pad is D, where D>0;
when being projected onto the array substrate, a border of an orthogonal projection of the bottom surface forms a first closed loop, and a border of orthogonal projection of the anti-crosstalk pad forms a second closed loop;
for any point of the first closed loop, the second closed loop has a corresponding point providing a shortest distance L between the any point of the first closed loop and the corresponding point of the second closed loop;
a set of shortest distances L corresponding to all the points of the first closed loop is a distance range between the first closed loop and the second closed loop; and
the distance range between the first closed loop and the second closed loop is greater than or equal to D*tan θ.

15. The display panel according to claim 1, wherein:
the organic light-emitting structure is a light source for the at least one fingerprint identification unit; and
the at least one fingerprint identification unit identities the fingerprint based on light emitted by the organic light-emitting structure and reflected to the at least one fingerprint identification unit by the touch object.

16. The display panel according to claim 1, further including a fingerprint-identification light source, wherein:
the array substrate has a first side facing the at least one fingerprint identification unit, and an opposing second side far away from the at least one fingerprint identification unit;
the fingerprint-identification light source is disposed on the second side of the array substrate; and
the at least one fingerprint identification unit identities the fingerprint based on light emitted by the fingerprint-identification light source and reflected to the at least one fingerprint identification unit by the touch object.

17. A display device comprising a display panel, wherein the display panel comprises:
an array substrate including a plurality of organic light-emitting structures;
at least one fingerprint identification unit configured to identity a fingerprint based on light reflected by a touch object to the at least one fingerprint identification unit, wherein an organic light-emitting structure has a first side facing the array substrate and an opposing second side, and the at least one fingerprint identification unit is disposed in a display region on the first side of the organic light-emitting structure;
a plurality of spacers, wherein an orthogonal projection of a space onto the array substrate is disposed between orthogonal projections of adjacent organic light-emitting structures onto the array substrate; and
a plurality of anti-crosstalk pads, wherein an anti-crosstalk pad is disclosed between the spacer and the at least one fingerprint identification unit, an orthogonal projection of the anti-crosstalk pad onto the array substrate includes a first region, the first region overlaps with the orthogonal projection of the spacer onto the array substrate, and the anti-crosstalk pad blocks light scattered by the spacer from entering the at least one fingerprint identification unit.

18. The display device according to claim 17, wherein:
the array substrate of the display panel includes a plurality of pixel driving circuits;
a pixel driving circuit of the display panel includes a data line, a scanning line, and a capacitor metal plate; and
at least one of the data line, the scanning line, and the capacitor metal plate is individually multiplexed as the anti-crosstalk pad.

19. The display device according to claim 17, wherein the display panel of the display device further includes:
an angle-confinement film, disposed between the anti-crosstalk pad and the at least one fingerprint identification unit.

* * * * *